US012659561B2

(12) United States Patent
Sugahara et al.

(10) Patent No.: US 12,659,561 B2
(45) Date of Patent: Jun. 16, 2026

(54) IMAGING APPARATUS WITH MULTIPLE IMAGES BEING FORMED ON A SINGLE LIGHT RECEIVING SURFACE

(71) Applicant: KYOCERA Corporation, Kyoto (JP)

(72) Inventors: Shun Sugahara, Yokohama (JP); Yusuke Hayashi, Kunitachi (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 18/710,226

(22) PCT Filed: Nov. 7, 2022

(86) PCT No.: PCT/JP2022/041425
§ 371 (c)(1),
(2) Date: May 15, 2024

(87) PCT Pub. No.: WO2023/090191
PCT Pub. Date: May 25, 2023

(65) Prior Publication Data
US 2024/0430553 A1 Dec. 26, 2024

(30) Foreign Application Priority Data
Nov. 16, 2021 (JP) ................................. 2021-186508

(51) Int. Cl.
*H04N 5/335* (2011.01)
*H04N 23/55* (2023.01)
*H04N 23/69* (2023.01)
(52) U.S. Cl.
CPC ............. *H04N 23/55* (2023.01); *H04N 23/69* (2023.01)

(58) Field of Classification Search
CPC ...................................................... G03B 17/17
See application file for complete search history.

(56) References Cited

U.S. PATENT DOCUMENTS

| | | | | |
|---|---|---|---|---|
| 5,161,051 | A | | 11/1992 | Whitney et al. |
| 5,751,473 | A | * | 5/1998 | Runciman ............ G02B 13/146 |
| | | | | 250/353 |
| 9,207,433 | B2 | * | 12/2015 | Blayvas ............... G02B 13/007 |

(Continued)

FOREIGN PATENT DOCUMENTS

| | | | |
|---|---|---|---|
| GB | 2 299 911 A | 10/1996 | |
| GB | 2635939 A * | 6/2025 | ........... G02B 27/286 |

(Continued)

*Primary Examiner* — Gary C Vieaux
(74) *Attorney, Agent, or Firm* — Studebaker Brackett PLLC

(57) ABSTRACT

Provided is an imaging apparatus configured to acquire a telephoto image and a wide-angle image at high resolution. An imaging apparatus (10) includes an imaging optical system (11) and an imaging device (12). The imaging optical system includes a first optical member (111) including a semi-transmissive reflective surface and a second optical member (112) including a reflective surface. The imaging device is configured to capture an image formed through the imaging optical system. Multiple images of different focal lengths are formed on a single light receiving surface of the imaging device. The imaging apparatus (10) may include a controller (13) configured to acquire an image signal from the imaging device (12) and separate the multiple images through image processing.

9 Claims, 5 Drawing Sheets

(56) References Cited

U.S. PATENT DOCUMENTS

| | | | |
|---|---|---|---|
| 2004/0179125 A1 | 9/2004 | Nagaoka | |
| 2009/0167929 A1 | 7/2009 | Nagaoka | |
| 2022/0080902 A1* | 3/2022 | Yamaguchi | ............... B60R 1/26 |

FOREIGN PATENT DOCUMENTS

| | | | |
|---|---|---|---|
| JP | H04-274406 A | 9/1992 |
| JP | H10-54939 A | 2/1998 |
| JP | H11-311832 A | 11/1999 |
| JP | 2004-279556 A | 10/2004 |
| JP | 2016-54487 A | 4/2016 |

* cited by examiner

OBJECT SIDE ←——→ IMAGE SIDE olim im1 im2

OBJECT SIDE ◄─── IMAGE SIDE

IMAGING APPARATUS WITH MULTIPLE IMAGES BEING FORMED ON A SINGLE LIGHT RECEIVING SURFACE

CROSS-REFERENCE TO RELATED APPLICATIONS

The present application claims priority to Japanese Patent Application No. 2021-186508, filed on Nov. 16, 2021, which is hereby incorporated by reference herein in its entirety.

TECHNICAL FIELD

The present disclosure relates to an imaging apparatus.

BACKGROUND OF INVENTION

An imaging optical system that forms an image of an observation target has a variety of physical properties, such as a focal length and an angle of view. A longer focal length causes an observation target to be formed as a more enlarged image. This provides detailed optical information on a remote observation target, or enlarged optical information. A wider angle of view provides optical information on observation targets located in a wider range. However, the focal length and the angle of view have a trade-off relationship. The angle of view decreases as the focal length is longer, whereas the angle of view increases as the focal length is shorter.

Therefore, the focal length is adjusted to acquire desired optical information based on circumstances. For example, the focal length is adjusted by displacing a zoom lens included in the imaging optical system. The focal length is adjusted by switching between multiple fixed-focal-length lenses (refer to Patent Literature 1 and Patent Literature 2).

CITATION LIST

Patent Literature

Patent Literature 1: Japanese Unexamined Patent Application Publication No. 11-311832
Patent Literature 2: Japanese Unexamined Patent Application Publication No. 2004-279556

SUMMARY

In an embodiment of the present disclosure, an imaging apparatus includes an imaging optical system and an imaging device. The imaging optical system includes a first optical member including a semi-transmissive reflective surface and a second optical member including a reflective surface. The imaging device is configured to capture an image formed through the imaging optical system. Multiple images of different focal lengths are formed on a single light receiving surface of the imaging device.

DESCRIPTION OF EMBODIMENTS

An imaging apparatus according to an embodiment of the present disclosure will be described below with reference to the drawings. For components illustrated in the following figures, the same component is assigned the same reference sign. The figures explaining embodiments are schematic. For example, a dimensional ratio in the figures does not necessarily match the actual one.

Figure 1:
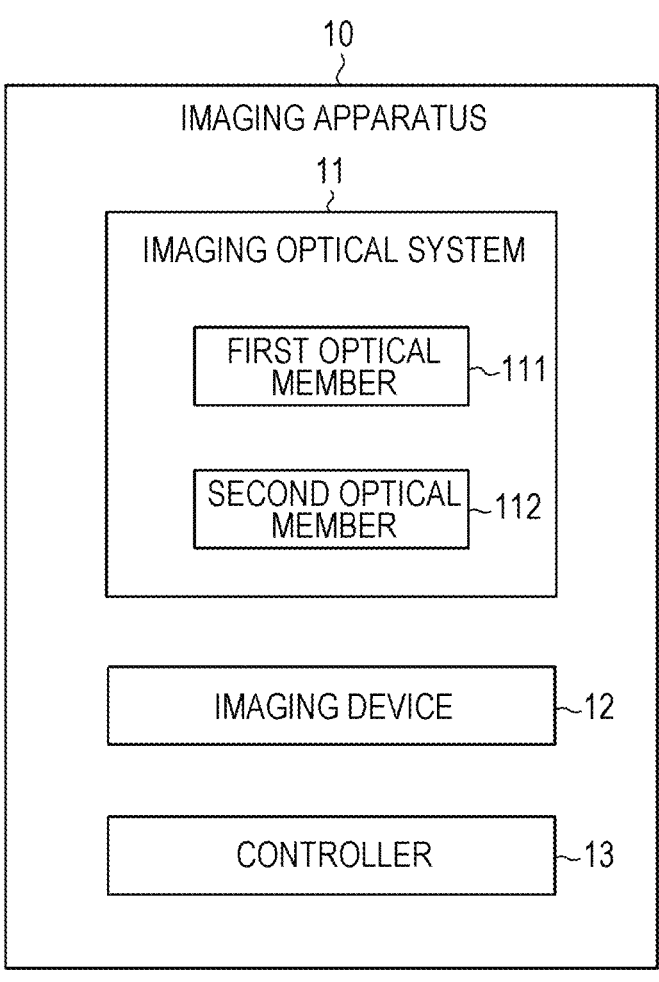
FIG. 1 is a block diagram illustrating an exemplary configuration of an imaging apparatus according to an embodiment.
Figure 2:
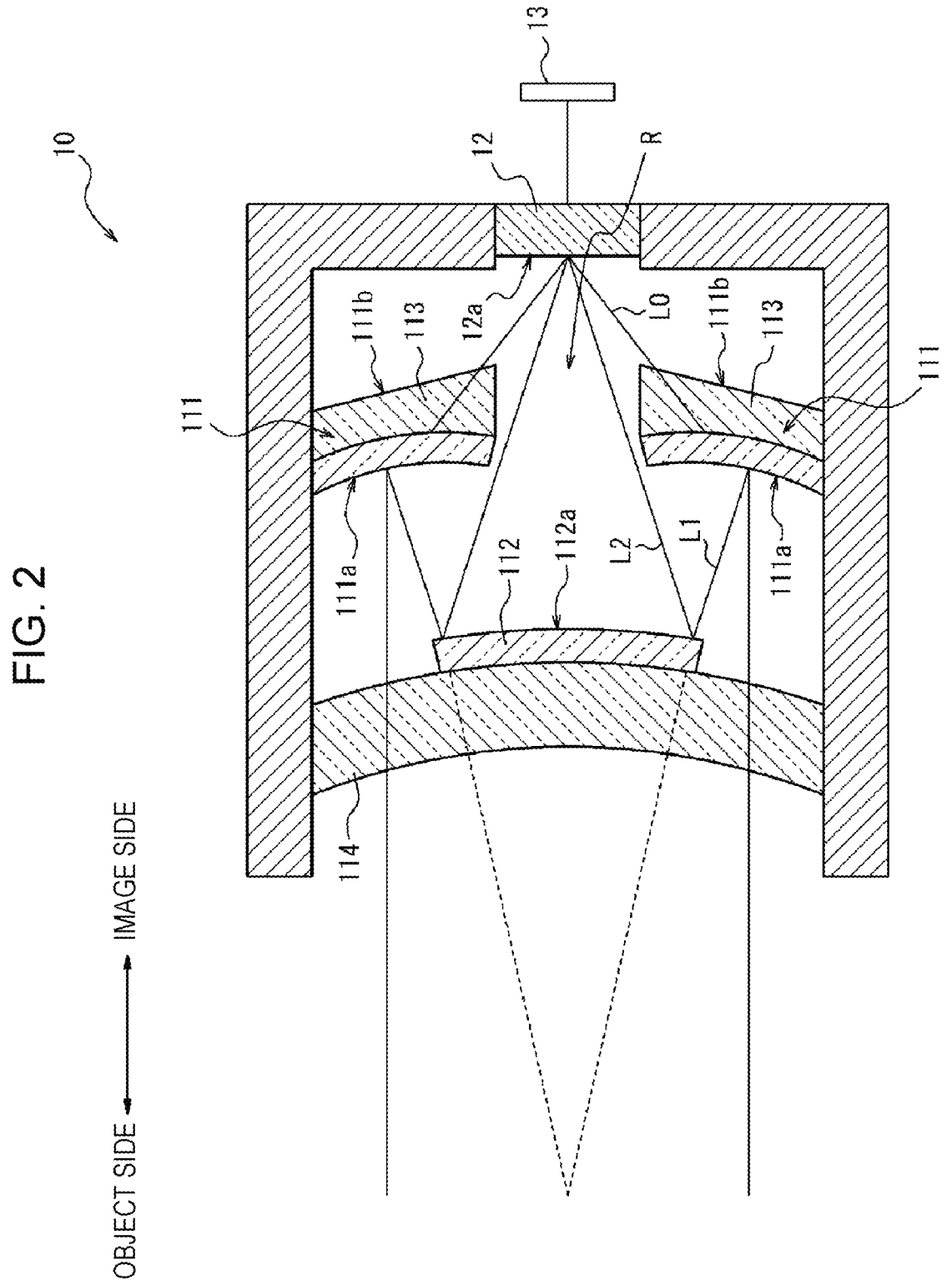
FIG. 2 is a sectional view of the imaging apparatus according to the embodiment illustrating an exemplary configuration of the imaging apparatus.

FIGS. 1 and 2 are diagrams illustrating an exemplary configuration of an imaging apparatus 10 according to an embodiment. FIG. 1 is a block diagram illustrating an exemplary logical configuration. FIG. 2 is a sectional view of the imaging apparatus 10 illustrating components disposed in the imaging apparatus. A configuration outline of the imaging apparatus 10 will be first described. In the embodiment of the present disclosure, as illustrated in FIG. 1, the imaging apparatus 10 includes an imaging optical system 11 and an imaging device 12. The imaging apparatus 10 may further include a controller 13.

The imaging optical system 11 includes a first optical member 111 and a second optical member 112. The first optical member 111 and the second optical member 112 each include one or more optical elements. The optical element may be, for example, a lens, a mirror, or a diaphragm. The first optical member 111 includes a semi-transmissive reflective surface 111a. The second optical member 112 includes a reflective surface 112a.

The imaging optical system 11 forms an image of an object beam passing through the first optical member 111 and impinging on the imaging device 12. The imaging optical system 11 forms an image of an object beam reflected by the reflective surface 111a of the first optical member 111 and the reflective surface 112a of the second optical member 112 and impinging on the imaging device 12. Hereinafter, the object beam may be simply referred to as light.

The imaging device 12 captures an image formed on a light receiving surface 12a through the imaging optical system 11. The imaging device 12 may be capable of capturing an image based on visible light, may be capable of capturing an image based on invisible light, such as infrared rays or ultraviolet rays, or may be capable of capturing an image based on visible light and an image based on invisible light. Examples of the imaging device 12 include a charge coupled device (CCD) image sensor and a complementary metal-oxide-semiconductor (CMOS) image sensor. The imaging device 12 may be a color image sensor. In other words, multiple pixels arranged on the light receiving surface 12a of the imaging device 12 may be covered with, for example, an RGB color filter. The imaging device 12 generates an image signal corresponding to an image based on received light. The imaging device 12 may generate image signals at a predetermined frame rate of, for example, 30 frames per second (fps).

The controller 13 includes at least one processor, at least one dedicated circuit, or a combination thereof. The processor is a general-purpose processor, such as a central processing unit (CPU) or a graphics processing unit (GPU), or a dedicated processor dedicated to specific processing. The dedicated circuit may be, for example, a field-programmable gate array (FPGA) or an application specific integrated circuit (ASIC). The controller 13 acquires an image signal from the imaging device 12 and performs image processing on the image signal. The image processing includes separating multiple images. The image processing will be described in detail later.

Placement of the components of the imaging apparatus 10 will now be described. As illustrated in FIG. 2, a side where an object is present relative to the imaging apparatus 10 may be referred to as an "object side" or "front". A side opposite to the object side may be referred to as an "image side" or "rear". FIG. 2 is a sectional view of the imaging apparatus 10 taken at a position where the imaging device 12 is located.

As illustrated in FIG. 2, the imaging optical system 11 includes a Cassegrain optical system including the first optical member 111 as a primary mirror and the second optical member 112 as a secondary mirror. In the embodiment, the reflective surface 111$a$ of the first optical member 111 is a concave mirror, and the reflective surface 112$a$ of the second optical member 112 is a convex mirror. An object beam from a remote object is reflected by the reflective surface 111$a$ and travels to the reflective surface 112$a$ (optical path L1). The beam is reflected by the reflective surface 112$a$, passes through a region R in the first optical member 111, and impinges on the imaging device 12 (optical path L2). In the embodiment, an image formed on the light receiving surface 12$a$ by the object beam traveling through the optical paths L1 and L2 is a telephoto image. The region R is an aperture.

The first optical member 111 includes the reflective surface 111$a$, which is semi-transmissive, and further includes a lens 113 with an aperture (region R) such that the lens 113 is located on the image side. The lens 113 is transparent but is not limited to being transparent. In the embodiment, the lens 113 is a doughnut-shaped lens. The region R is not limited to an aperture as long as the region R does not block light from the secondary mirror of the above-described Cassegrain optical system to the imaging device 12. For example, the lens 113 may include a lens having a curvature different from curvatures of portions other than the region R such that the lens is located in the region R or may include a transparent plate or a filter in the region R. An object beam corresponding to a wide-angle image passes through the reflective surface 111$a$ and the lens 113 and then impinges on the imaging device 12 (optical path L0). For example, a curvature of the lens 113 is determined so that light passing through the lens 113 forms an image on the light receiving surface 12$a$. The reflective surface 111$a$ may have a curvature different from that of a surface of the lens 113 that is located on the image side. In other words, a front surface (reflective surface 111$a$) of the first optical member 111 and a rear surface 111$b$ thereof do not necessarily need to have the same curvature. A wide-angle image may be an image captured at a larger angle of view than a telephoto image is captured, and is not limited to an image captured at a specific or larger angle of view. A telephoto image may be an image with an image magnification higher than that of a wide-angle image, and is not limited to an image with a specific or higher image magnification.

When an object beam corresponding to a telephoto image travels through the optical path L1 and the optical path L2 and reaches the imaging device 12, an object beam corresponding to a wide-angle image simultaneously travels through the optical path L0 and reaches the imaging device

12. Thus, multiple images, that is, an image formed through the Cassegrain optical system and an image formed through the lens 113 without being via the second optical member 112 as a secondary mirror are formed on the light receiving surface 12$a$. In other words, multiple images of different focal lengths are formed on the same light receiving surface 12$a$ of the imaging device 12.

As illustrated in FIG. 2, a second lens 114 may be disposed on a surface of the second optical member 112 that is located on the object side. The second lens 114 may also function as a support fixing the second optical member 112 in place.

Figure 3:
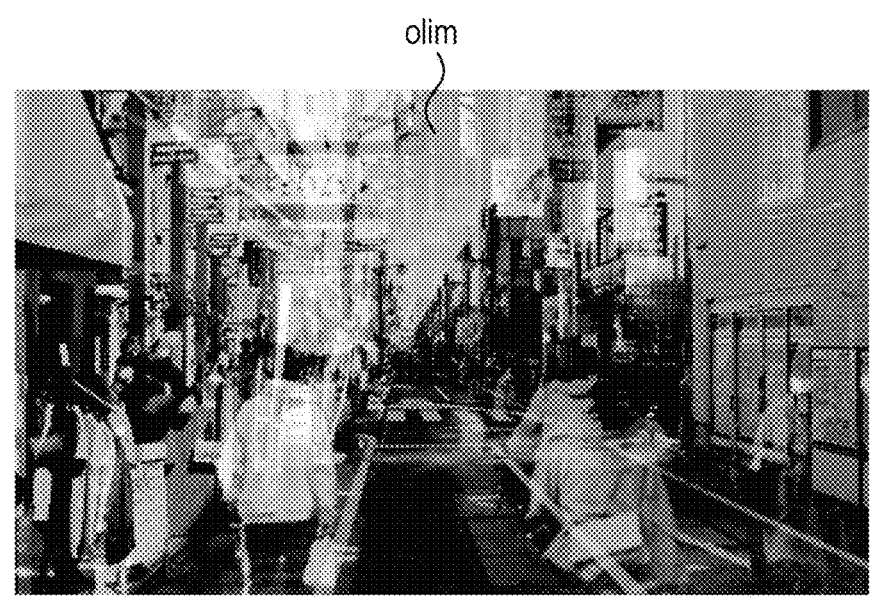
FIG. 3 is a diagram explaining a composite image and telephoto and wide-angle images generated from the composite image.
Figure 3:
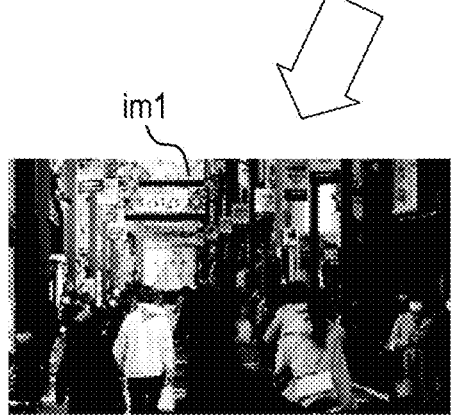
Figure 3:
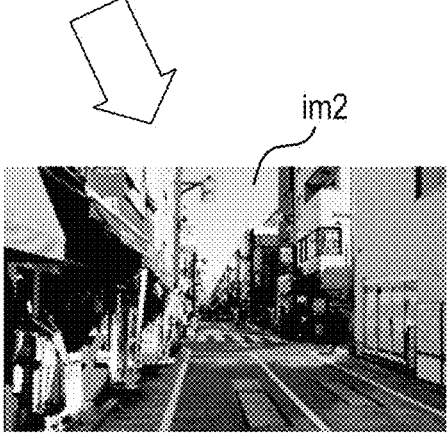

FIG. 3 is a diagram explaining a composite image olim, a telephoto image im1, and a wide-angle image im2, the telephoto image im1 and the wide-angle image im2 being generated from the composite image olim. In the example of FIG. 3, the telephoto image im1 corresponds to an image obtained by capturing an image of objects on a remote road, which is located at the center of the wide-angle image im2, at high resolution. An image formed on the light receiving surface 12$a$ corresponds to the composite image olim (in an upper part of FIG. 3) based on the telephoto image im1 and the wide-angle image im2. The composite image olim contains optical information of the telephoto image im1 and optical information of the wide-angle image im2. The imaging device 12 generates an image signal of the composite image olim and outputs the signal to the controller 13.

The controller 13 separates the composite image olim into the telephoto image im1 and the wide-angle image im2 through image processing. The controller 13 separates the composite image olim by using an image processing method, such as independent component analysis, a wavelet method, or an image separation model. The image separation model is, for example, a model built in advance by superimposing multiple images on each other to generate a composite image and machine-learning multiple images as correct answers for the composite image. The image separation model may be a model using the Pix-to-Pix technique in which a generator to generate an image in a manner similar to that in an Encoder-Decoder model and a discriminator to determine whether the generated image is a false image are caused to contest with each other to generate paired images that reflect such a relationship.

In a case where the controller 13 performs image processing for image separation by using the image separation model built through machine learning in advance, the image separation model may be stored in a storage unit accessible by the controller 13. The storage unit includes one or more memories. The memory can be any of memories including, but not limited to, a semiconductor memory and a magnetic memory. The storage unit may be incorporated in, for example, the controller 13, or may be located outside the controller 13.

Figure 4:
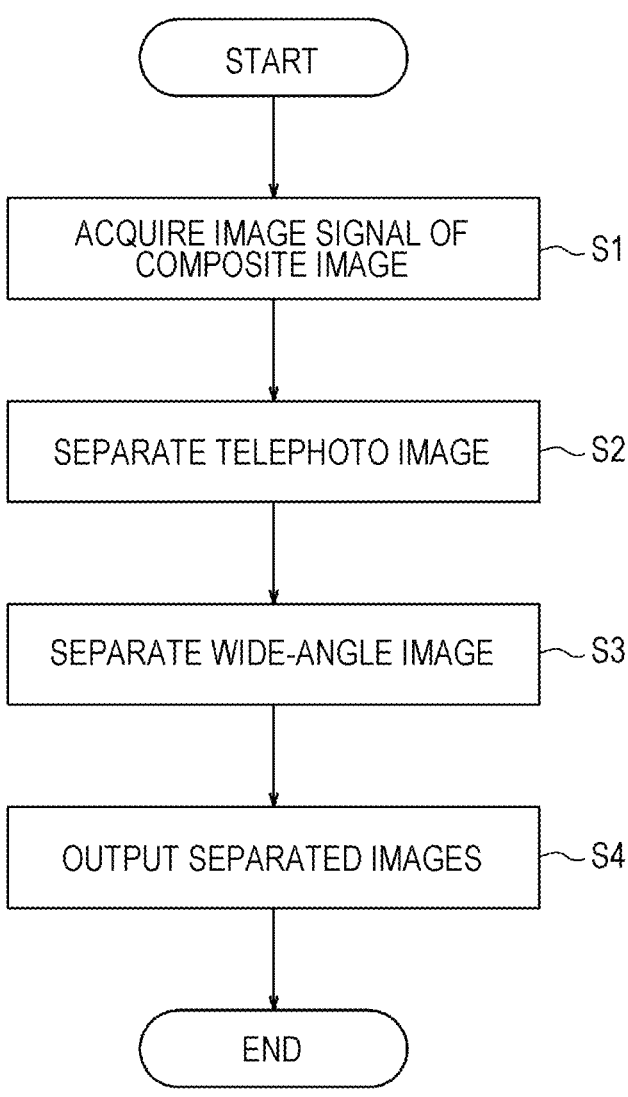
FIG. 4 is a flowchart explaining image processing by a controller.

FIG. 4 is a flowchart explaining image processing by the controller 13. In the embodiment, the controller 13 separates the composite image olim into the telephoto image im1 and the wide-angle image im2 by using the image separation model built through machine learning in advance.

The controller 13 acquires an image signal of the composite image olim from the imaging device 12 (step S1).

The controller 13 extracts components determined as the telephoto image im1 from the image signal of the composite image olim by using the image separation model, thereby separating the telephoto image im1 from the composite image olim (step S2).

The controller 13 removes the components of the telephoto image im1 from the image signal of the composite image olim to separate the wide-angle image im2 from the composite image olim (step S3).

The controller 13 outputs the separated telephoto image im1 and wide-angle image im2 to, for example, a display such as any of various displays (step S4).

In this example, the telephoto image im1 and the wide-angle image im2 in steps S2 and S3 may be interchanged with each other. In other words, in another example, the wide-angle image im2 may be separated from the composite image olim in step S2. In step S3, components of the wide-angle image im2 may be removed from the image signal of the composite image olim, thereby separating the telephoto image im1 from the composite image olim.

The controller 13 can accurately separate the composite image olim into the telephoto image im1 and the wide-angle image im2 by using the image separation model generated through machine learning. To further increase the accuracy of separation, the controller 13 may limit color components of at least one image. For example, the imaging apparatus 10 may be configured such that a first image including a first color component and a second color image including a second color component different from the first color component are formed as multiple images and superimposed on each other on the light receiving surface 12a. The first image and the second image are multiple images formed on the light receiving surface 12a, and correspond to the telephoto image im1 and the wide-angle image im2, respectively. For example, the first color component may be one component of RGB, and the second color component may include remaining color components that are not selected as the first color component.

To form images with such limited color components, the imaging apparatus 10 may be configured such that at least one of the first optical member 111 or the second optical member 112 includes a color filter. For example, the reflective surface 111a of the first optical member 111 may be a dichroic coating or mirror that reflects or transmits a specific color of light. The first optical member 111 may include an antireflective film on the rear surface 111b opposite the reflective surface 111a, serving as a front surface. In the example of FIG. 2, the antireflective film can be disposed on a surface of the lens 113 that is located on the image side. The antireflective film can increase the transmittance of a specific color of light.

For example, it is assumed that the dichroic coating or mirror, serving as the reflective surface 111a, reflects the G component of RGB and the antireflective film on the surface of the lens 113 on the image side transmits the R and B components with high transmittance. In this case, an image including the G component and corresponding to the telephoto image im1 and an image including the R and B components and corresponding to the wide-angle image im2 are formed and superimposed on each other on the light receiving surface 12a. As another combination, the antireflective film may transmit only one of the R component and the B component with high transmittance, and the telephoto image im1 including the G component and the wide-angle image im2 including only one of the R component and the B component may be formed and superimposed on each other on the light receiving surface 12a. As another combination, the dichroic coating or mirror may reflect the G and B components, and the telephoto image im1 including the G and B components and the wide-angle image im2 including the R component may be formed and superimposed on each other on the light receiving surface 12a.

The controller 13 may separate the telephoto image im1 or the wide-angle image im2 from the image signal of the composite image olim by using the image separation model and/or the color components instead of the image separation model. In a case where the image separation model and the color components are used in combination, for example, the controller 13 may separate, as the telephoto image im1 or the wide-angle image im2, an image acquired by further extracting only a specific color component from a potential image of the telephoto image im1 or the wide-angle image im2 separated by using the image separation model.

In the embodiment, the imaging apparatus 10 with the above configuration can acquire a telephoto image and a wide-angle image at high resolution in the above-described manner.

While the embodiments of the present disclosure have been described with reference to the drawings and examples, it should be noted that those skilled in the art can easily make a variety of variations or modifications based on the present disclosure. Therefore, it should be noted that these variations or modifications fall within the scope of the present disclosure. For example, functions included in each component or the like can be rearranged so as not to be logically inconsistent, and multiple components can be combined into one or can be divided.

Figure 5:
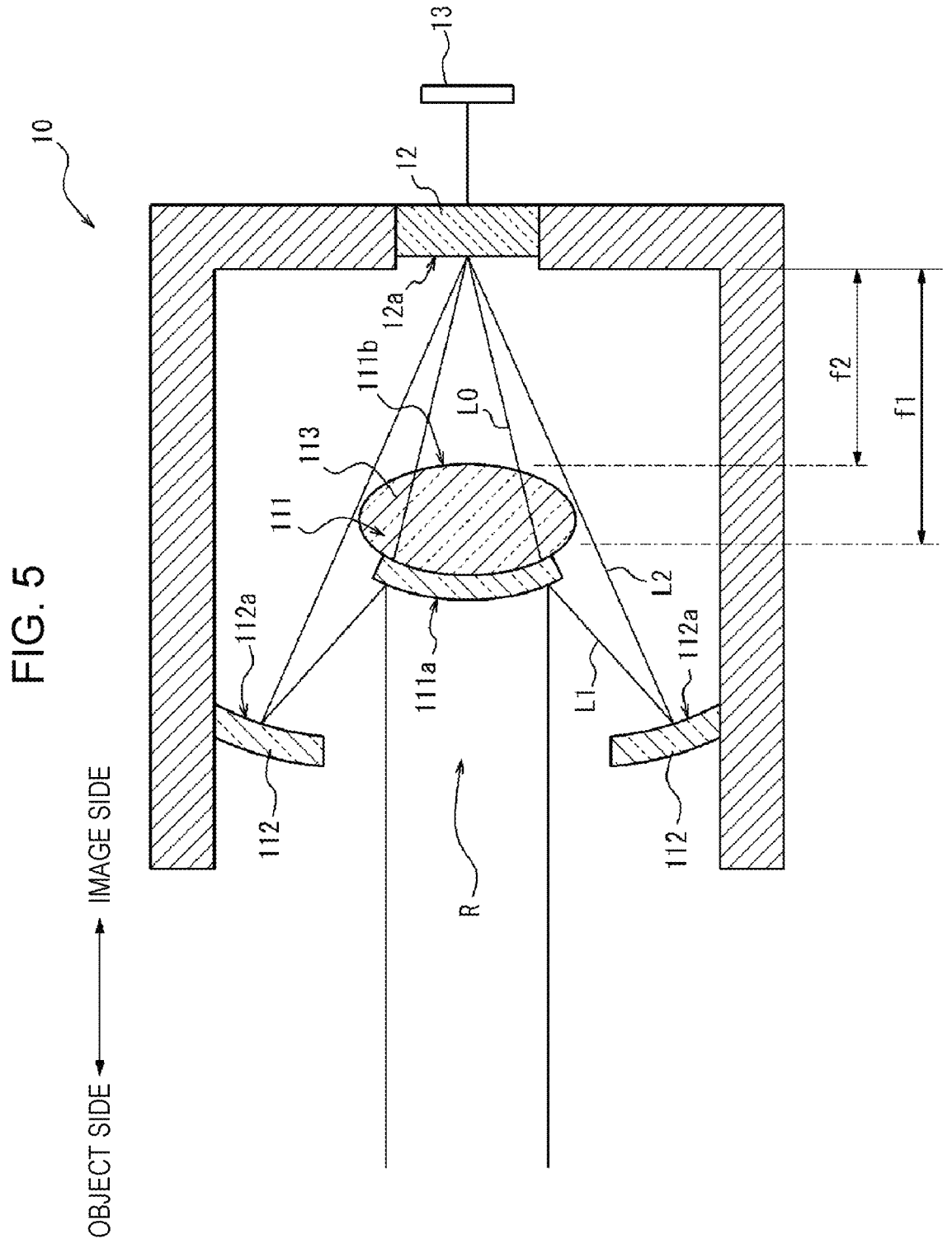
FIG. 5 is a sectional view of the imaging apparatus according to the embodiment illustrating another exemplary configuration of the imaging apparatus.

For example, in the above-described embodiment, the imaging optical system 11 includes a Cassegrain optical system. The configuration is not limited to this example. FIG. 5 is a sectional view of the imaging apparatus 10 illustrating another exemplary configuration of the imaging apparatus. In FIG. 5, the same component as that in FIG. 2 is assigned the same reference sign. In this alternative embodiment, the imaging apparatus 10 includes the same components as those in the above-described embodiment. As illustrated in FIG. 5, not the first optical member 111 but the second optical member 112 includes the region R, which transmits light. More specifically, in the alternative embodiment, the imaging optical system 11 of the imaging apparatus 10 is configured such that at least part of the reflective surface 111a of the first optical member 111 faces the reflective surface 112a of the second optical member 112 and such that the second optical member 112 is located closer to an object than the first optical member 111. The first optical member 111 is located at a position where part of light traveling from the object and passing through the region R of the second optical member 112 is reflected by the reflective surface 111a of the first optical member 111 and where part of the light is transmitted through the first optical member 111. Although the region R may be an aperture as illustrated in FIG. 5, an optical element, such as a lens, a transparent plate, or a filter, may be disposed in the region R. Multiple images formed on the light receiving surface 12a include an image formed by light transmitted through the first optical member 111 and an image formed by light reflected by the reflective surface 111a of the first optical member 111 and the reflective surface 112a of the second optical member 112.

In FIG. 5, the lens 113 of the first optical member 111 on the image side has a focal length f1.

In the alternative embodiment, the imaging apparatus 10 with the above configuration can acquire a telephoto image and a wide-angle image at high resolution. The controller 13 performs the same image processing as that in the above-described embodiment.

All component requirements described in the present disclosure and/or all the steps of any method or process disclosed may be combined in any combination, except combinations where such features are mutually exclusive. Each feature described in the present disclosure can be replaced by an alternative feature serving the same, equivalent or similar purpose, unless expressly denied. Thus, unless expressly denied, each of the features disclosed is merely one example of a generic series of identical or equivalent features.

Furthermore, embodiments according to the present disclosure are not limited to any of the specific configurations of the above-described embodiments. Embodiments according to the present disclosure can be extended to all novel features or combinations thereof described in the present disclosure or all novel methods or processing steps or combinations thereof described herein.

In the present disclosure, terms "first", "second", and the like are identifiers to distinguish between the components. The components distinguished with the terms "first", "second", and the like in the present disclosure can be interchanged in number. The identifiers are interchanged simultaneously. After the identifiers are interchanged, the components are distinguished from each other. The identifiers may be removed. The components with the identifiers removed are distinguished from each other by using reference signs. The description of identifiers such as "first" and "second" in the present disclosure should not be used as a basis for interpreting the order of the components or the existence of identifiers with smaller numbers.

REFERENCE SIGNS 10 imaging apparatus
11 imaging optical system
12 imaging device
12*a* light receiving surface
13 controller
111 first optical member
111*a* reflective surface
111*b* rear surface
112 second optical member
112*a* reflective surface
113 lens
114 second lens

The invention claimed is:

1. An imaging apparatus comprising:
an imaging optical system including
   a first optical member including a semi-transmissive reflective surface and
   a second optical member including a reflective surface;
an imaging device configured to capture an image formed through the imaging optical system; and
a controller configured to acquire an image signal from the imaging device and separate the multiple images through image processing,
wherein multiple images of different focal lengths are formed on a single light receiving surface of the imaging device, and wherein the controller performs the image processing by using an image separation model built through machine learning in advance.

2. The imaging apparatus according to claim 1, wherein a first image including a first color component and a second image including a second color component different from the first color component are formed as the multiple images and superimposed on each other on the light receiving surface.

3. The imaging apparatus according to claim 1, wherein
the semi-transmissive reflective surface of the first optical member is a dichroic coating or mirror, and
the first optical member includes an antireflective film on a rear surface opposite the semi-transmissive reflective surface, serving as a front surface.

4. The imaging apparatus according to claim 3, wherein the semi-transmissive reflective surface and the rear surface have different curvatures.

5. The imaging apparatus according to claim 1,
wherein the imaging optical system includes a Cassegrain optical system including the first optical member as a primary mirror and the second optical member as a secondary mirror,
wherein the first optical member includes a lens including a region that transmits light from the secondary mirror to the imaging device, and the region is located adjacent to an image, and
wherein the multiple images include an image formed through the Cassegrain optical system and an image formed through the lens without being via the secondary mirror.

6. The imaging apparatus according to claim 5, wherein the region is an aperture.

7. The imaging apparatus according to claim 5, wherein the lens is transparent.

8. The imaging apparatus according to claim 1,
wherein, in the imaging optical system, at least part of the reflective surface of the first optical member faces the reflective surface of the second optical member, and the second optical member is located closer to an object than the first optical member,
wherein the first optical member is located at a position where part of light traveling from the object and passing through an aperture of the second optical member is reflected by the reflective surface of the first optical member and where part of the light is transmitted through the first optical member, and
wherein the multiple images include an image formed by light transmitted through the first optical member and an image formed by light reflected by the reflective surface of the first optical member and the reflective surface of the second optical member.

9. The imaging apparatus according to claim 8, wherein the first optical member includes a lens located adjacent to an image.

* * * * *